United States Patent [19]

Sircom

[11] 4,053,815

[45] Oct. 11, 1977

[54] GROUND FAULT INTERRUPTERS

[75] Inventor: Richard C. Sircom, Scarborough, Canada

[73] Assignee: Federal Pacific Electric Company, Newark, N.J.

[21] Appl. No.: 569,061

[22] Filed: Apr. 17, 1975

Related U.S. Application Data

[63] Continuation of Ser. No. 395,422, Sept. 10, 1973, Pat. No. 3,879,639, which is a continuation of Ser. No. 320,855, Jan. 4, 1973, abandoned.

[51] Int. Cl.$^2$ .............................................. H02H 3/28
[52] U.S. Cl. ........................................ 361/42; 361/63; 361/113
[58] Field of Search ................... 317/18 D, 27 R, 53, 317/33 SC; 331/1 R, 62

[56] References Cited

U.S. PATENT DOCUMENTS

| 3,638,072 | 1/1972 | Kobayashi | 317/18 D X |
| 3,713,003 | 1/1973 | Benham | 317/18 D |
| 3,754,194 | 8/1973 | Camp, Jr. | 331/1 R |
| 3,786,356 | 1/1974 | MacPhee | 317/18 D |
| 3,800,189 | 3/1974 | Montz | 317/18 D |
| 3,801,871 | 4/1974 | Loh | 317/18 D |
| 3,879,639 | 4/1975 | Sircom | 317/18 D |

Primary Examiner—J. D. Miller
Assistant Examiner—Patrick R. Salce
Attorney, Agent, or Firm—Paul S. Martin; Lawrence A. Hoffman

[57] ABSTRACT

In a distribution circuit for connecting a load to an a-c source, it is known that a ground-to-neutral short tends to reduce the sensitivity of ground fault detectors that use a differential current transformer to sense line-to-ground leakage. A resonated coil on a core links the neutral conductor forming part of a protective device for interrupting the load circuit in the event of reduced Q of the resonated coil caused by a neutral-to-ground fault. The core must also link the line conductor, for otherwise a loop including the line, the load and the neutral would wrongly have a like effect.

The same core and coil are used with a common amplifier for the neutral-to-ground fault detector and for the line-to-ground leakage detector, so that the apparatus can be economical and compact. Furthermore, so long as there is no neutral-to-ground fault, the amplifier delivers a signal of normal strength that monitors the integrity of both detectors. The detector also responds to "run-away" of the monitoring signal generator.

5 Claims, 5 Drawing Figures

GROUND FAULT INTERRUPTERS

This is a continuation of application Ser. No. 395,422, filed Sept. 10, 1973 and now U.S. Pat. No. 3,879,639, which in turn is a continuation of application Ser. No. 320,855, filed Jan. 4, 1973 and now abandoned.

The present invention relates to ground fault detectors for protecting an alternating current distribution line.

BACKGROUND OF THE INVENTION

Ground-fault protectors for alternating current distribution circuits have attracted increasing interest and concern recently, especially of the type having high sensitivity for protecting people against dangerous shocks due to line-to-ground leakage. The National Electric Code now provides for certain applications of ground-fault circuit interrupters activated in response to 5 milliamperes of line-to-ground leakage. The most practical type of ground leakage detector includes a differential current transformer (DCT) having a common core that encircles both (or all) of the conductors to the load. A secondary winding on the core normally provides no output, assuming the load currents in the conductors produce mutually cancelling magentic fields in the core. Any line-to-ground leakage represents a current in one line conductor that returns to ground by a path other than the neutral conductor. Such a current produces uncancelled flux in the core, resulting in output from the DCT to trip the circuit interrupter.

A low-resistance path from the neutral to ground might be present when a hazardous line-to-ground leakage path occurs. A neutral-to-ground fault tends to reduce the sensitivity of a DCT as a ground fault sensing device, because a neutral-to-ground fault tends to provide a return current path via the neutral for a large percentage of the line-to-ground leakage current. To the extent that line-to-ground leakage current returns to the source via the neutral, that escapes detection by the DCT. Consequently the DCT loses sensitivity and may not respond to an actual 5 milliampere ground leakage current (a hazardous level in the NEC code) where there is a low-resistance neutral-to-ground fault.

Various devices have heretofore been proposed for taking into account the possibility of a ground-to-neutral fault which could reduce the sensitivity of a ground fault detector, for example U.S. Pat. No. 3,473,091 issued Oct. 18, 1969 to Morris et al. Such devices have various disadvantages, in terms of cost and complexity, and in terms of bulk of the apparatus that becomes important in applications where compactness is required.

SUMMARY OF THE INVENTION

The invention involves a number of novel, related features. In one aspect, a novel detector is provided for responding to a neutral-to-ground fault of such low impedance as to reduce significantly the sensitivity of an associated line-to-ground leakage detector. More generally, a novel detector is provided for signalling the occurrence of a neutral-to-ground fault. In certain applications, simplicity and compactness are important, and reliability is also important so that fail-safe circuits are desirable.

For achieving these advantages, a ring core of magnetic material encircles the usual line and neutral conductors that are to energize a load. There may be one or more line conductors. A winding of many turns on the core is resonated by a shunt capacitor.

The line and neutral conductors represent two primary windings that are linked to the core and to the multi-turn winding equally and in opposite sense, considering the magnetic fields of the load current in those conductors. More than one turn of the line and the neutral about the core are feasible, but where heavy currents are to be handled and bulk is to be avoided, single-turn windings are used. The resonated multi-turn winding has a high Q, which is to be sharply reduced by a neutral-to-ground fault. The neutral is grounded at the source, and grounding of the neutral along the load-circuit wiring forms a loop linking the core. The loop loads the core and reduces Q of the resonant circuit. However, this effect is difficult to realize at the alternating-current supply frequency, typically 60 Hz. There would be need for enormous inductance and high-permeability cores, particularly tape-wound cores. Such cores, in turn, are lossy and stand in the way of attaining high values of Q, and they are costly. In the illustrative embodiment of the invention, 5,000 Hz is used effectively, and a ferrite core is utilized for its low-loss quality even though its premeability is much lower than that of cores usually used for efficient DCTs. AT 5,000 Hz the ferrite core and its multi-turn winding can be quite small and compact, only large enough to encircle the conductors that carry the 60 Hz load current. Moreover a ferrite core is very inexpensive.

It is necessary for the core to encircle the line conductor (s) even though this is a test for a neutral-to-ground fault. Otherwise, with the line conductor(s) outside the core, the line-load-neutral-source circuit would form a loop linking the core and simulating a neutral-source fault-ground loop in its effect on the Q of the resonated coil.

As a further feature of the invention, the same core and multi-turn winding of the neutral-to-gound fault detector are utilized for a line-to-ground fault and leakage detector. In this way the combined detectors can be made economically and in very compact form. Both detectors also use a common amplifier.

The neutral-to-ground fault detector demonstrates the safe condition of the neutral conductor by maintaining substantial output. A neutral-to-ground fault severly reduces the output. Failure of the amplifier or a break in the circuit also has the effect of reducing the output severely, so the circuit is self-checking, fail-safe. Furthermore, because the line-to-ground leakage detector uses the same core, coil and amplifier as the neutral-to-ground fault detector, the latter also serves as an integrity checker for the line-to-ground leakage detector.

The illustrative embodiments described in detail below represent presently preferred fault detectors. However, they are variously modified and they are applicable in variety of situation. Thus, while a single line conductor is included in the illustrative embodiments, two line conductors can be included with the neutral, in a three-wire single phase system; and in like sense the invention is applicable to the three line conductors of a three phase system.

The nature of the invention, including the foregoing and other novel features, aspects and advantages will be clear from a review of the description below of the illustrative embodiments of the invention, shown in the accompanying drawings.

Figure 1:
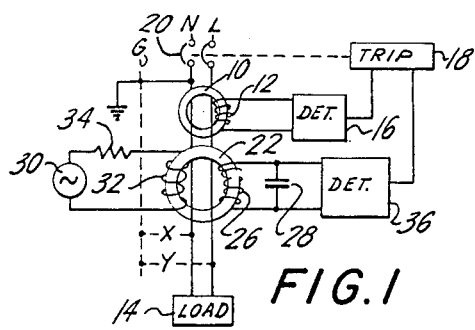
FIG. 1 is a combined wiring and block diagram of illustrative apparatus embodying certain principles underlying the invention.

In FIG. 1, the line and neutral conductors of a two-wire alternating current circuit are designated L and N. The neutral is grounded near the source terminals, and a conventional grounding conductor G is also connected to ground and to the neutral near the supply terminals. The grounding conductor G may take the form of conductive armored cable enclosing wires L and N, or it may be a "green" wire to which the frames and metal enclosures of various items of electrical equipment are connected for safety.

It sometimes happens that a leakage current path Y develops between line L and ground or the grounded conductor G, and this represents a hazard. For example, if a person were to touch a portion of poorly insulated conductor L while standing on wet earth, he would become a leakage path to ground and he could suffer a serious electrical shock. In recent years particularly, and extending over a great many years in the past, it has been a practice to guard against ground fault current paths by using a zero sequence transformer or a differential current transformer (DCT) as it is also known, linking the line and neutral conductors (and any other conductors that may form part of the system to be protected). The output of the secondary winding of the DCT is used for providing a warming of the fault or for operating a circuit breaker or other circuit interrupter to deenergize the line (and load) conductor(s). For example, a magnetic core 10 bearing a secondary winding 12 constitutes such a differential current transformer, wires L and N extending to load 14 through the opening in the core. Wires L and N constitute single-turn primary windings of the DCT. The load current flows in opposite directions in conductors L and N so that the magnetic effects of those currents are mutually cancelling in relation to magnetic core 10. Consequently, under normal conditions there is no output signal in secondary winding 12. However, in the event of even a slight ground-leakage current path Y developing between the line conductor L and ground, that leakage current does not return to the source via neutral N. The component of current in conductor L representing the leakage produces magnetic flux in the core which is not cancelled so that an output signal appears at secondary winding 12. If that output signal represents 5 milliampere leakage current or more (according to a recently adopted standard in the National Electric Code) then detector 16 provides an output signal for causing trip device or tripper 18 to open the contacts 20 of a circuit interrupter for deenergizing the conductors supplying load 14. Device 18 may be a solenoid for operating a contact-releasing mechanism, or it may be a relay or a contactor for controlling the opening of contacts 20.

It is possible for a short circuit or a low-resistance connection X to develop between the neutral conductor N and the ground conductor G. While that would not of itself represent a danger to people, the DCT tends to become desensitized by such connection. It will be appreciated that, if connection X is established and if a line-to-ground leakage current path Y were to develop between line L and ground or the grounding conductor G, some of the fault current in path Y would extend through conductor G and fault X, and back to the a-c supply along the neutral. That current is carried by line conductor L and should produce an output signal in the DCT for activating detector 16, to activate trip device 18 of the circuit interrupter. For operating a contact-releasing mechanism, or it may be a relay. Some of the ground-fault current in fault-current path Y could return to the neutral supply terminal by way of the low resistance connection X between neutral and ground or the grounded conductor. In that event a portion of the fault current of path Y would return to the a-c supply along the neutral conductor N. That component of the ground-leakage current would not produce any contribution to the output signal in secondary winding 12, a condition that represents a loss of sensitivity of the detection system. This is a widely recognized condition and one that has been met in various ways. The circuit of FIG. 1 represents a novel approach to the problem of guarding against the consequences of such neutral-to-ground faults.

Core 22 encircles the neutral and line conductors L and N from the a-c supply terminals to load 14. Winding 26 on the core has a shunt capacitor 28, this winding and this capacitor forming a circuit that resonates at the frequency of excitation supply 30. This supply excites core 22 by supplying current to primary winding 32 through current limiting resistor 34 proportioned for causing constant excitation in coil 32 regardless of the transformer loading.

Under normal conditions, i.e. in the absence of ground faults X and Y, the excitation from source 30 causes a large signal voltage to appear across the terminals of parallel-resonant circuit 26, 28 and this is utilized in detector 36 to represent a normal condition so as not to send an activating signal to trip 18. In the event of a short-circuit at path X, then a loop is formed including the neutral conductor, the short circuit, the grounding conductor G, and back to the neutral conductor. That loop current-path represents a load on the transformer. It is close-coupled to winding 26 and, as a damping loop, it reduces the resonant voltage developed across the terminals of winding 26. The supply 30 cannot compensate for this loss because of the limitation imposed by current limiting resistor 34. The appearance of short circuit or ground-fault current path X consequently reduces the input to detector 36 which then causes operation of trip 18. Inasmuch as the appearance of the ground fault X between neutral and the ground or grounding conductor renders the ground fault detector 16 unsafe because of its loss of sensitivity, it is desirable for the interrupter contacts 20 to deenergize the line and neutral conductors to load 14.

It is apparent that a loop current path is formed by the source, line conductor L, load 14 and neutral conductor N. This loop extends through the core 22. However, since the two conductors forming the loop both extend through and return through the opening of the core 22, thus retracing the same path, the inductive effects of a current that may flow in this loop are mutually cancelling in respect to core 22. No signal from source 30 is induced in the loop of line conductor L, load 14 neutral conductor N and the source.

The ground leakage detector including core 10, winding 12 and detector 16 is provided for detecting small levels of leakage currents developing in path Y, and on that basis it might seem completely unnecessary for the line conductor L to be threaded through core 22. However, it is important for not only the neutral conductor but also the line conductor to extend through core 22. If line conductor L did not extend through the window of core 22 and instead bypassed that core, then the loop consisting of line conductor L, load 14, neutral conductor N and the source would represent the same kind of damping loop linking core 22 as the loop described above including neutral conductor N, short-circuit path X and grounding conductor G. Thus, while the detection of a neutral-to-ground fault path X in no way depends upon the line conductor L, it is nevertheless necessary for line conductor L to extend through core 22.

Figure 2:
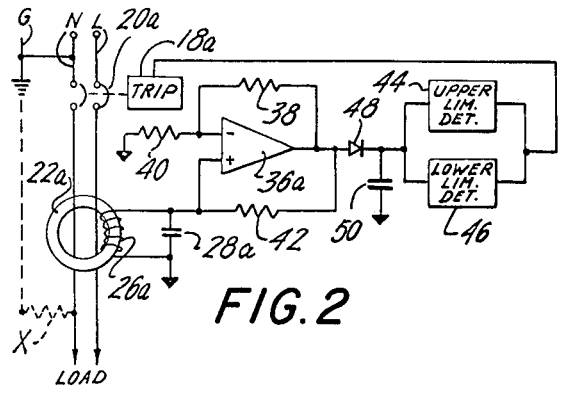
FIG. 2 is a wiring and block diagram of an illustrative embodiment of certain features of the invention.

FIG. 2 illustrates a practical form of a neutral-to-ground fault detector discussed in principle in connection with FIG. 1. The same numbers are used in FIG. 2 with distinguishing suffixes "a" to designate the corresponding components appearing in FIG. 1. This practice is followed in FIGS. 3, 4 and 5 as well, using distinguishing suffixes "b" and "c". Accordingly, in FIG. 2 the line and neutral conductors extend to the load through a toroidal magnetic core 22a bearing output winding 26a which forms a parallel resonant circuit with capacitor 28a. Operational amplifier 36a has a pair of input terminals designated "plus" and "minus" which represent the non-inverting input and the inverting input terminals of the amplifier, respectively. Resistors 38 and 40 provide negative feedback for stabilizing the amplifier. Resistor diagramatically represents a regenerative feedback path to the non-inverting input portion of the amplifier. Amplifier 36a with its positive and negative feedback paths and with resonant circuit 26a, 28a is proportioned to constitute an oscillator, typically operating at 5,000 Hz.

The output of amplifier 36a, as an oscillator, is supplied to upper-limit detector 44 and to lower-limit detector 46 through rectifier 48 whose output is smoothed by filter capacitor 50.

The negative feedback path 38 of amplifier 36 is adjusted so that there is a standard means output voltage supplied to the limit detectors 44 and 46 under conditions. The feedback path is adjusted such that, when neutral-to-ground current path X develops a resistance low enough to desensitize the differential current transformer of the ground fault detector beyond the danger point, the output of amplifier 36, resonant circuit 26a, 28a and regenerative feedback path 42 is severely damped. Ideally at the danger point where the resistance of fault X becomes too low, the oscillation is suppressed. Under such neutral-to-ground fault conditions, the output of rectifier 48 to lower-limit detector 46 falls below the threshold of that detector which, accordingly, delivers a tripping signal to tripper 18a. The same consequence would ensue in case the oscillator itself should become weak or of it should fail entirely. In this respect, the circuit has an important fail-safe property, a self-monitoring characteristic.

Another condition that could develop, and which would interfere with the intended detection of a neutral-to-ground fault, is the possibility of the oscillator running away, that is, developing an extremely large and unpredicted level of output. To guard against the abnormality, upper-limit detector 44 is provided. It is arranged so that, in case of excessive oscillator output, detector 44 delivers a tripping signal to tripper 18a.

Apparatus of the kind represented in FIG. 2 is intended for use in a variety of applications. In one application, the circuit is incorporated into a circuit breaker, and in that case miniaturization of the control circuit is a matter of some importance. Moreover, the line and neutral conductors in that application are intended to carry 15, 20 or 30 amperes, and much higher currents in some installations. Conductors for carrying such heavy currents are inherently of large cross section (considering the conductor and its installation) and consequently in practice the line conductor and neutral conductor are arranged to pass only once through core 22a. The excitation in winding 26a induces equal and opposite voltages in the line and neutral conductors threading through core 22a and consequently the loop current path represented by the line conductor, the load and the neutral conductor has essentially no effect on the neutral-to-ground detection system described. They could be coaxial conductors for absolutely minimized effect. In any case, as in FIG. 1, it is important for the line conductor to extend through the window of core 22a in order for the line-load-neutral-source loop to remain ineffective, not simulating a fault-signal loop like the neutral-to-fault-to-ground conductor current path which the system is designed to detect.

Characteristically, ground fault path X which is to be detected is of the order of 4 ohms or less. It is permissible for the system to respond to a higher value of ground fault X than 4 ohms. Consequently, the system is not particularly critical. In order for the apparatus to detect a loop impedance of that value linking core 22a, it is a distinct advantage to use a much higher excitation frequency than the usual 60 Hz of the alternating current supply system for energizing the load. A resonant frequency of about 5 kHz has been found eminently effective for producing the kind of operation described above in detecting a neutral-to-ground loop impedance of about 4 ohms and lower. In this connection, one important factor is the Q of the resonant circuit. In an example, a Q of 30 has been attained, using a ferrite core made by Phillips, 768T188-3E2A, with 75 turns of AWG 27 copper wire as winding 26a.

Figure 3:
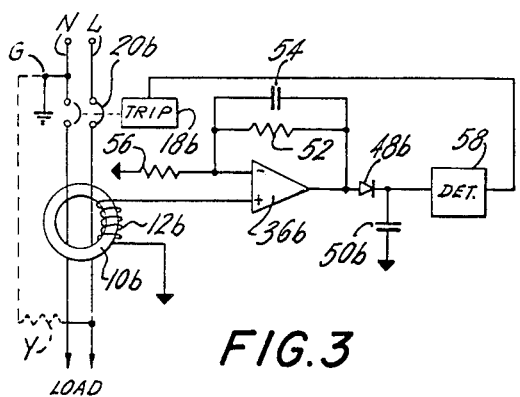
FIG. 3 is a wiring and block diagram illustrating further features of the invention.

FIG. 3 illustrates a ground fault detector that may be used with the neutral-to-ground detector of FIG. 2. In FIG. 3, circuit interrupter contacts 20b controlled by a trip unit 18b are arranged to interrupt a supply of alternating current from the input terminals along line and neutral conductors L and N to a load. Linking the line and neutral conductors is a differential current transformer including a toroidal core 10b having a secondary winding 12b. The line and neutral conductors are so arranged that load current in those conductors produces mutually cancelling magnetic fields in the toroidal core. However, in the event of a ground-fault providing leakage current of as little as 5 milliamperes, that current flows via ground or a grounding conductor G, back to the grounded connection of the neutral at the a-c supply. That current flows along a path that bypasses neutral conductor N. Consequently, the leakage current is carried by line conductor L through the toroidal core 10b and does not return via neutral conductor N. Such leakage produces an output in winding 12b that is amplified by operational amplifier 36b. Amplifier 36b has a negative feedback network diagramatically represented by feedback resistor 52, shunt feedback capacitor 54 that has neglible impedance at 5 kHz, and ground-return resistor 56. To an approximation, the 60 Hz gain of the amplifier may be taken as equal to the sum of the resistances 52 and 56, divided by the resistance 56. The value of resistor 52 is made high in relation to resistor 56, so that the amplifier has a high gain. However, since resistor 52 is bypassed by a small capacitor 54, the impedance to high frequencies (for example, 5 kilohertz) is very low. For example, the gain of amplifier 36b at 5 kilohertz is close to unity, while at 60 Hz the gain is about 500. This high gain at 60 Hz makes up for the lower permeability of ferrite core 10b as compared to the permeability of cores ordinarily used for differential current transformers in ground fault detectors. This circuit can develop dependable output from 5 milliampere ground-fault signals. A rectifier diagramatically represented by diode 48b transmits the output of amplifier 36b to detector 58, smoothed by capacitor 50b. Tripper 18b is actuated when the current in ground fault path Y exceeds a standard level, as for example 5 milliamperes.

Figure 4:
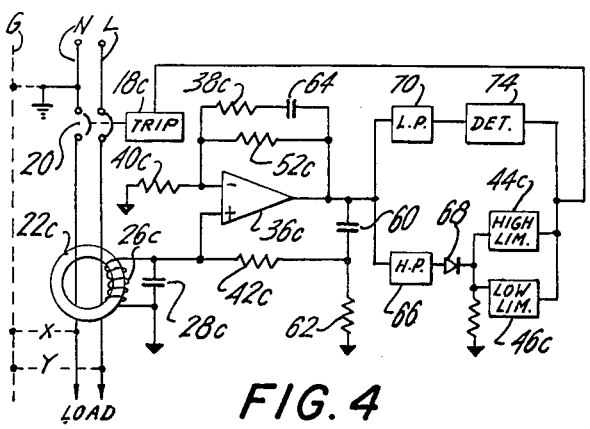
FIG. 4 is a wiring and block diagram of an illustrative embodiment of the features of FIGS. 2 and 3, including further novel features.

FIG. 4 shows diagramatically a combined system for detecting both a neutral-to-ground fault X which would desensitize a differential current transformer in a ground fault detector, and for detecting a line-to-ground fault for low-level leakage path Y. As in the previous diagrams, a circuit interrupter 20c is interposed in the line and neutral conductors L and N controlled by a trip unit 18c. The line and neutral conductors extend through a toroidal core 22c. Each of the conductors forms a single-turn primary winding linking that core. A winding 26c on core 22c is connected in parallel with capacitor 28c, resonant to a much higher frequency than that of the alternating current supply that energizes lines L and N, 5000 Hz for example. A much higher frequency would not be desirable because at frequencies higher than about 10,000 Hz, the inductive reactance of the neutral-fault-ground loop would become excessive for practical operation of the neutral-to-ground fault detector.

Operational amplifier 36c is connected at its non-inverting input terminal to resonant circuit 26c, 28c; and positive feedback is provided to the non-inverting input terminal by a high-pass filter including capacitor 60 and shunt resistor 62, and feedback resistor 42c. The proportions of capacitor 60 and resistor 62 are such that there is sharp discrimination against the alternating current supply frequency, while there is ample feedback at the 5,000 Hz resonant frequency of circuit 26c, 28c.

Limiting the gain of amplifier 36c at the 5,000 Hz frequency of the oscillator is a negative feedback path including resistor 38c and a small capacitor 64 from the output terminal of the amplifier to the inverting input terminal of the amplifier, and a ground-return resistor 40c. The relation of capacitor 64 to resistors 38c and 40c is effective for discriminating sharply against the 60 Hz frequency of line L and N. Moreover, the proportions of the inverting feedback network just described are to give amplifier 36c a low and stabilized amplification characteristic at 5,000 Hz, determined (as in FIG. 2) by the proportions of resistors 38c and 40c.

The 5,000 Hz output of the amplifier 36c is relayed via high-pass filter 66 and rectifier 68 to biased detectors 44c and 46c. These detectors provide no output for a range of different amplitudes of the oscillator-frequency signal, but in the event that the oscillator should fall below a critical level, then detector 46c produces an output signal to activate trip 18c and open the circuit interrupting contact 20c. As in the circuit of FIG. 2, low-level output or zero output of the 5,000 Hz signal indicates either a failure of the oscillator or a low-resistance neutral-to-ground fault X. Both these conditions warrant the opening of the protective circuit interrupter since the circuit should no longer be considered safe. Runaway of the 5KHz oscillator is protected against by high limit detector 44c, which is biased at its input by a resistor connected to ground as shown. In the event of an oscillator output above a predetermined level, detector 44c provides an output signal to actuate trip unit 18c.

In the event of a low-level fault Y between line conductor L and ground or the ground-return wire G, which may be as low as 5 milliamperes in certain National Electric Code applications, a 60 Hz signal is developed in winding 26c and amplified by amplifier 36c. Only limited feedback is provided between the output of the amplifier and its inverting input terminal, via resistor 52c. Consequently, for 60 Hz, the closed-loop gain of the operational amplifier is high for sensitive response to the 60 Hz leakage-current signal in winding 26c. The gain may be 1000, for example, making up for a relatively low permeability of the ferrite core 22c which is used to assure high Q of the winding 26c and its resonating capacitor 28c at 5,000 Hz.

The 60 Hz output of amplifier 26 is transmitted via low-pass filter 70 to detector 74. In the event of 60 Hz leakage signals developing in path Y, exceeding a predetermined level as determined by detector 74, peaks of the output signal excursions are provided for activating tripper 18c.

The apparatus of FIG. 4 is economical in the obvious advantage of using a common core-and-coil unit 22c and 26c both for deriving a signal representing ground leakage in path Y and for monitoring the neutral against the appearance of a low impedance ground fault X. Moreover, the amplifier 36c serves in both functions. Additional to this considerable economy is the fact that the continued proper performance of the oscillator as evidenced by no output being produced by either detector 44c or 46c, provides assurance of the integrity of the ground leakage detector system which also includes coil 26c and amplifier 36c. As a further important benefit where miniaturization is to be achieved, is the fact that only a single core 22c and only a single coil 26c are needed (disregarding the line and neutral single-turn primaries) for both detection functions.

Figure 5:
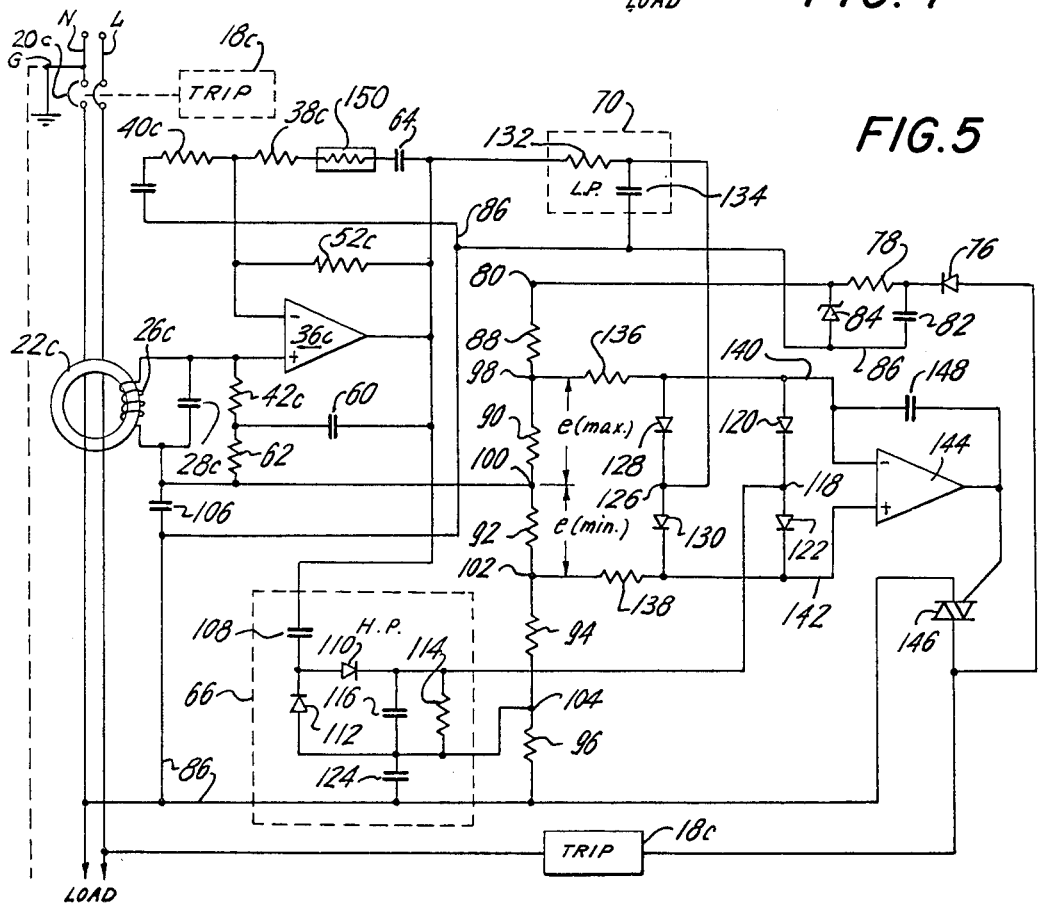
FIG. 5 is a detailed wiring diagram of the embodiment of FIG. 4.

FIG. 5 represents a detailed wiring diagram of the apparatus of FIG. 4. Identical reference numerals are used in FIGS. 4 and 5 for corresponding components and duplication of their description is omitted in the discussion of FIG. 5, in the interest of conciseness.

The circuit of FIG. 5 has a direct current supply energized by a current path from line conductor L through contacts 20c controlled by trip unit 18c. A d-c supply includes diode 76 and resistor 78 connected in series to the direct current output terminal 80. Capacitor 82 smooths the rectified output and Zener diode 84 clamps the direct-current output to maintain terminal 80 at a stable potential. The negative return conductor 86 extends to the neutral conductor N. The fact that diode 76 is not connected directly to line conductor L, but instead is connected to the line conductor via trip unit 18c is a matter of convenience. The amount of current drawn by the direct current supply is very slight, far below the level needed to actuate the trip unit. However, by providing the connection of the direct current supply to the point illustrated is of advantage is miniaturizing the physical apparatus because only a single connection is required to line and load conductors L and N.

A stabilized d-c supply voltage is thus provided between terminal 80 and negative-return conductor 86. A voltage divider is connected between these points, including series resistors 88, 90, 92, 94 and 96, having taps 98, 100, 102 and 104. Capacitor 106 between terminal 100 and negative return line 86 bypasses tap 100 of the voltage divider to the grounded neutral N. Operational amplifier 36c has a connection from its non-inverting input terminal via resistors 42c and 62, to tap 100 of the voltage divider, giving the amplifier a voltage reference. Complete d.c. negative feedback from the amplifier output through resistor 52c to the inverting input maintains the output terminal of the amplifier at the potential of tap 100 in the absence of input signals. Capacitor 124 optionally shunts resistor 96 of the voltage divider.

The output of operational amplifier 36c is connected to high-pass filter 66, which receives and rectifies the 5,000 Hz signal. Filter 66 includes a small capacitor 108 to transmit 5,000 Hz signals and to discriminate against 60 Hz signals; a voltage doubling rectifier including diodes 110 and 112, a resistor 114 for loading the rectifier and filter, and a smoothing capacitor 116. Resistor 114 and filter capacitor 116 have a negative return connection to tap 104 of the voltage divider, and the positive signal-output terminal of the filter-and-rectifier unit 66 is connected to junction 118 between clamping diodes 120 and 122.

Low pass filter 70 includes a resistor connected between the output terminal of amplifier 36c and a junction 126 between diodes 128 and 130. Filter 70 includes a series resistor 132 and a shunt capacitor 134 and discriminates prominently in favor of the 60 Hz signal and against the 5,000 Hz signal.

The anodes of diodes 120 and 128 are connected together at line 140 and returned through resistor 136 to tap 98 of the voltage divider. The cathodes of diodes 122 and 130 are connected together at line 142 and returned through resistor 138 to tap 102 of the voltage divider.

Considering tap 100 to provide a mean voltage potential for the system, tap 98 provides an upper limit and tap 102 provides a lower limit (plus and minus) respectively for signals appearing at junctions 118 and 126. For better understanding it may be useful to assign illustrative voltages to the taps of the voltage divider. Accordingly, the total voltage between terminal 80 and negative return line 86 may be taken as 24 volts, setting tap 100 at 12 volts, tap 98 and tap 102 at 14 volts and 10 volts respectively (for example) and tap 104 may be 8 volts.

Lines 140 and 142 extend to the inverting and non-inverting inputs of operational amplifier 144. The output of operational amplifier 144 is connected to the control electrode of a triac 146. The main terminals of the triac are connected to neutral conductor N and trip unit 18c respectively so that, when a triggering signal appears at the output of amplifier 144, triac 146 becomes conducting to alternating current and operates trip unit 18c.

The operation of the circuit in FIG. 5 may now be described, without repeating the basic description of FIG. 4. Under normal conditions the output of high-pass filter and rectifier unit 66, added to the bias developed at tap 104, causes terminal 118 to operate at a mean value equal to the potential of tap 100. Under such conditions the voltage between taps 98 and 102 causes a current to flow through resistor 136, diodes 120 and 122, and resistor 138. Terminal 98 in the above example operates normally at 14 volts and terminal 102 in that example operates normally at 10 volts. In the absence of ground faults X and Y, lines 140 and 142 have a voltage above and below the potential of terminal 118 to the extent of the voltage drop in diodes 120 and 122, one-half volt for example. Terminal 126 operates at the mean output potential of amplifier 36c. It remains at that voltage in the absence of a 60 Hz ground-fault condition between line conductor L and ground. This potential is established by the voltage reference connection of the non-inverting input of operational amplifier 36c to tap 100 in the voltage divider as mentioned above. Due to the current path through resistor 136, diode 128, diode 130 and resistor 138, lines 140 and 142 will operate at a potential slightly above and slightly below that of terminal 126 unless a 60 Hz ground-fault from line L is present.

Operational amplifier 144 has its inverting input terminal connected to line 140 and its non-inverting input terminal connected to line 142. Under these conditions, the amplifier which operates as a high gain amplifier having positive potential at its inverting input and negative potential at its non-inverting input drives its output terminal hard to ground.

It may be considered that a leakage current path Y develops between line conductor L and ground such that trip 18c is to be operated. Under such conditions, a 60 Hz signal appears at junction 126 between diodes 128 and 130. When the leakage reaches the hazard level, there is sufficient amplitude of the 60 Hz signal to reverse-bias diodes 128 and 130 alternately, in the alternate positive and negative half-waves of the ground-fault signal. During the positive half-wave excursion of the 60 Hz fault signal, line 140 is prevented from swinging more positive than tap 98 (because the diode 128 is reverse-biased) but line 142 can be forced to swing more positive than line 140 and tap 98. In that case, the non-inverting input becomes more positive than the inverting input and amplifier 144 develops a strong positive output signal and fires triac 146. During the negative half-wave excursion of the 60 Hz fault signal, line 142 is prevented from swinging more negative than tap 102, due to reverse-biasing of diode 130, but line 140 can be forced to swing more negative than tap 102 with sufficient 60 Hz signal amplitude. In this case, the inverting input of amplifier 144 is driven more negative than the non-inverting input. Once again the output of amplifier 144 becomes strongly positive and triac 146 is fixed. It is seen accordingly, that so long as the voltage at junction 126 varies within limits determined mainly by taps 98 and 102 of the voltage divider, the potential at the inverting input of amplifier 144 remains more positive than the input at the non-inverting input of amplifier 144 and the output remains strongly negative. When the signal output from low pass filter 70 becomes high enough to represent a dangerous leakage path Y (FIG. 4) from the line conductor to ground, then the level detector diodes 128 and 130 together with operational amplifier 144 (acting as high and low level detectors) causes firing of triac 146 and causes actuation of tripper 18c.

Quite separately, the output of high-pass filter 66 controls the potential of junction 118 between diodes 120 and 122. In case the oscillator should become grossly unstable so that its output rises to an extremely high level-called "run-away", the potential of junction 118 would rise sufficiently above tap 98 to cause the operational amplifier 144 to fire triac 146. In case of a low resistance fault between the neutral conductor N and the ground conductor G (FIG. 4) constituting a loop that loads coil 26c and its core 22c, then the oscillator output would fall to a very low level or, properly designed, the oscillator might be damped entirely out of operation. In that event, the potential of junction 118 would drop to a point sufficiently below voltage of tap 102 to cause line 140 to become more negative than line 142. This condition also causes operational amplifier 144 to develop strong positive output and fire triac 146, thereby to energize tripper 18c.

The circuits of FIGS. 4 and 5 achieve all of the advantages of the neutral-to-ground detector of FIG. 2 and the line-to-ground leakage detector of FIG. 3 as indicated above. Moreover, considerable economy is realized by utilization of a single core 22c and coil 26c for both line-to-ground leakage detection and neutral-to-ground fault detection. This economy is extended in that a common amplifier 36c is used for both functions. The economy is realized both in terms of the cost of equipment and also in terms of reduced bulk of the resulting apparatus. The cross section of the line and neutral conductors including their insulation is substantial, particularly in the case of devices for carrying 30-amperes of load current. Since these conductors pass through a toroidal core, it may be readily appreciated that core 22c itself is of a certain minimum bulk. Compactness is realized by avoiding a second core that is otherwise necessary for achieving a compact dual detector, for detecting both types of fault. Moreover, as has been indicated in connection with FIG. 4, the fact that a single amplifier 36c is used together with a single coil 26c for both types of fault detection enables the neutral-to-ground detector to serve as its own fail-safe monitoring system and it also enables the neutral-to-ground monitoring system to serve as an integrity check for the line-to-ground leakage detector. So long as amplifier 36c and all of the connections to coil 26c remain intact and so long as the various connections to amplifier 36c are proper, the dual detector system provides a large measure of fail-safe assurance that the 60 Hz leakage detection system is in good working order.

In common experience, transient disturbances often occur in the load circuit supplied by conductors L and N. In case such transients reach sufficient magnitude, a single spike that is not related to ground leakage could momentarily reverse the normal condition of amplifier 144, thus firing the triac. Capacitor 148 in the inverting feedback path of amplifier 144 serves as an integrator of output pulses, delaying the operation of the triac in response to amplifier output while the capacitor integrates the successive pulses. Thus, triac 146 will fire only in response to a train of pulses or a sustained "on" input signal to the amplifier but not in response to occasional voltage spikes that are not related to fault conditions.

In each of the circuits above, the DCT's have the same low-loss ferrite cores, in order to realize high values of Q. At 50 or 60 Hz and using tape-wound cores of high-permeability ferromagnetic alloys usually used for current transformers, the typical value of Q to be expected is about unity. With a ferrite core, at 5 kHz, a Q of 30 for the resonant circuit can be realized. The appearance of a neutral-to-ground fault herein has a much more prominent effect than in apparatus having a low Q, and in apparatus that does not utilize resonance, as discussed above.

Various details to meet practical performance requirements will naturally be included. For example, a thermistor 150 is included in a feedback path of amplifier 36c (FIG. 5) for compensating for the effects of temperature variations in the operation of the resonated winding 26c on core 22c. This and other such details are within the ordinary skill of the art.

The nature of the invention and its various novel features are naturally susceptible of being modified and applied in various ways by those skilled in the art. Consequently, the invention should be construed broadly in accordance with its full spirit and scope.

I claim:

1. A neutral-to-ground fault detector for a distribution circuit to supply alternating current at about 60 Hz to a load, where the circuit includes line and neutral conductors extending to load-connection terminals, and where the neutral conductor has a ground connection, said neutral-to-ground fault detector including a differential current transformer having a core, single turn primary windings forming current paths in series with said line and neutral conductors respectively, between said load-connection terminals and said ground connection of said neutral conductor, said primary windings being arranged to produce mutually concelling magnetic effects in the core due to load current carried thereby, and a multi-turn winding on the core, means including a capacitor connected to said multiturn winding for producing resonance therein at a frequency substantially higher than 60 Hz, said core and said resonated winding being formed to have a Q greatly in excess of unity at the resonant frequency, means for exciting said resonated winding within its pass band, and means for detecting the reduction of Q of the resonated winding resulting from a neutral-to-ground fault on the portion of said neutral conductor remote from said ground connection, and line-to-ground leakage detecting means having control means selectively responsive to 60 Hz signals exceeding a prescribed level and having input signal means coupled to said core.

2. A neutral-to-ground fault detector in accordance with claim 1, wherein said exciting means is an oscillator which includes said resonated winding as a frequency - determining part thereof.

3. A neutral-to-ground fault detector in accordance with claim 2, including a circuit breaker having normally closed contacts in series with said line conductor and having tripping means for opening the contacts, and a control circuit for maintaining said tripping means inactive in response to sustained output of the oscillator, said control circuit being effective to cause tripping of the circuit breaker both in the event of failure of said oscillator and in the event of reduction of the output of the oscillator as upon reduction of Q of the resonated winding resulting from a neutral-to-ground fault.

4. A neutral-to-ground fault detector in accordance with claim 3, wherein the control means of said line-to-ground leakage detecting means comprises a second control circuit selectively responsive to 60 Hz signals and being coupled to said tripping means for activating the latter in response to a 60 Hz signal exceeding a prescribed level.

5. A neutral-to-ground fault detector in accordance with claim 1, wherein the line and neutral conductors each pass once through the core of said differential current transformer to form single turn primaries.

* * * * *